(12) United States Patent
Cok

(10) Patent No.: US 6,975,008 B2
(45) Date of Patent: Dec. 13, 2005

(54) CIRCUIT FOR DETECTING AMBIENT LIGHT ON A DISPLAY

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/694,560

(22) Filed: Oct. 27, 2003

(65) Prior Publication Data

US 2005/0087825 A1    Apr. 28, 2005

(51) Int. Cl.[7] .............................................. H01L 27/14
(52) U.S. Cl. ........................................ 257/414; 257/40
(58) Field of Search ....................... 257/414, 40, 79, 257/124, 228, 257, 277, 258

(56) References Cited

U.S. PATENT DOCUMENTS

| 4,769,292 A | | 9/1988 | Tang et al. | |
|---|---|---|---|---|
| 5,061,569 A | | 10/1991 | VanSlyke et al. | |
| 5,491,330 A | | 2/1996 | Sato et al. | |
| 6,023,259 A | * | 2/2000 | Howard et al. | ................ 345/76 |
| 6,320,325 B1 | * | 11/2001 | Cok et al. | ................ 315/169.3 |
| 6,489,631 B2 | * | 12/2002 | Young et al. | ................ 257/59 |
| 2001/0052597 A1 | | 12/2001 | Young et al | |
| 2002/0181112 A1 | | 12/2002 | Bechtel et al | |
| 2004/0075045 A1 | * | 4/2004 | Hermsen | ................ 250/205 |

FOREIGN PATENT DOCUMENTS

| DE | 24 46 610 | 4/1976 |
|---|---|---|
| JP | 06/282231 | 1/1994 |
| JP | 2002/72920 | 3/2002 |
| JP | 2002-297096 | 10/2002 |
| JP | 2003/29710 | 1/2003 |

* cited by examiner

Primary Examiner—David Nelms
Assistant Examiner—Thinh T Nguyen
(74) Attorney, Agent, or Firm—Andrew J. Anderson; Thomas H. Close

(57) ABSTRACT

A circuit for detecting ambient light on a display includes a light integrating photosensor circuit having a photosensor and being responsive to ambient light for periodically producing successive photo signals representing the intensity of the ambient light; and an averaging circuit for receiving the successive photo signals and producing an average ambient light signal representing a continuous running average of the successive photo signals.

22 Claims, 3 Drawing Sheets

CIRCUIT FOR DETECTING AMBIENT LIGHT ON A DISPLAY

FIELD OF THE INVENTION

The present invention relates to photosensor circuits and more particularly to solid state flat panel displays having photosensors for sensing ambient illumination.

BACKGROUND OF THE INVENTION

Flat panel displays such as liquid crystal displays (LCDs) or organic light emitting diode (OLED) displays are useful in a wide variety of applications under a wide variety of environmental conditions. When viewed in a dark environment (little ambient radiation), such displays need not be as bright as when viewed in a lighter environment (more ambient radiation). If the display light output is adjusted periodically to compensate for ambient light conditions, the display can maintain a fixed ratio between the ambient and displayed light even if the ambient light changes. This can, in turn, increase display brightness to improve visibility in a bright environment and increase display device lifetime and reduce power usage by reducing unnecessary display brightness in a dark environment.

The use of photosensors with displays to detect ambient light and adjusting the brightness of the display in response to ambient illumination is known. Efficient silicon photosensors are available and generally provide a current proportional to the light incident on the sensor. These photosensors are constructed on silicon substrates. Such sensors can be combined with displays to provide ambient sensing. For example, see JP2002-297096-A, which describes a circuit for providing ambient compensation to an electroluminescent display. However, as implemented, the sensor is separate from the display and senses the light at a single point. This increases the cost, number of components, and size of the device; reduces the sensitivity of the sensor; and does not directly measure the light incident on the display itself.

It is known to integrate a light sensor on an active-matrix display device for the purpose of sensing light emitted from the display device itself. See for example, U.S. Pat. No. 6,489,631 issued Dec. 3, 2002 to Young et al., which describes a display having integrated photosensors for sensing light emitted by a light emitting element of the display. However, the arrangement of the sensor coupled with a light emitter limits the size of the photosensor and its ability to sense ambient light. Moreover, such photosensors constructed on flat panel displays do not have the efficiency of those constructed on silicon substrates and do not have the sensitivity necessary to provide a signal representative of lower light levels, for example <100 cd/m2, where displays are often used. Hence, alternative circuits and designs are necessary.

When providing ambient compensation to a display, it is important that the light sensing device provide a continuously valid output that is always representative of the ambient illumination. If, instead, the output is periodically invalid, any compensation will be periodically incorrect and may cause flicker in the display. Alternatively, additional circuitry must be added to sample and hold the output of the light sensing device. Moreover, it is advantageous to provide a signal output that is representative of the ambient illumination over a range of light levels.

There is a need therefore for an improved photosensor for the detection of ambient light within an active matrix flat panel display.

SUMMARY OF THE INVENTION

The need is met according to the present invention by providing a circuit for detecting ambient light on a display that includes a light integrating photosensor circuit having a photosensor and being responsive to ambient light for periodically producing successive photo signals representing the intensity of the ambient light; and an averaging circuit for receiving the successive photo signals and producing an average ambient light signal representing a continuous running average of the successive photo signals.

Advantages

The advantages of this invention are an improved photosensor circuit for ambient compensation in low light conditions that can be readily integrated within an active matrix flat panel display.

DETAILED DESCRIPTION OF THE INVENTION

Figure 1:
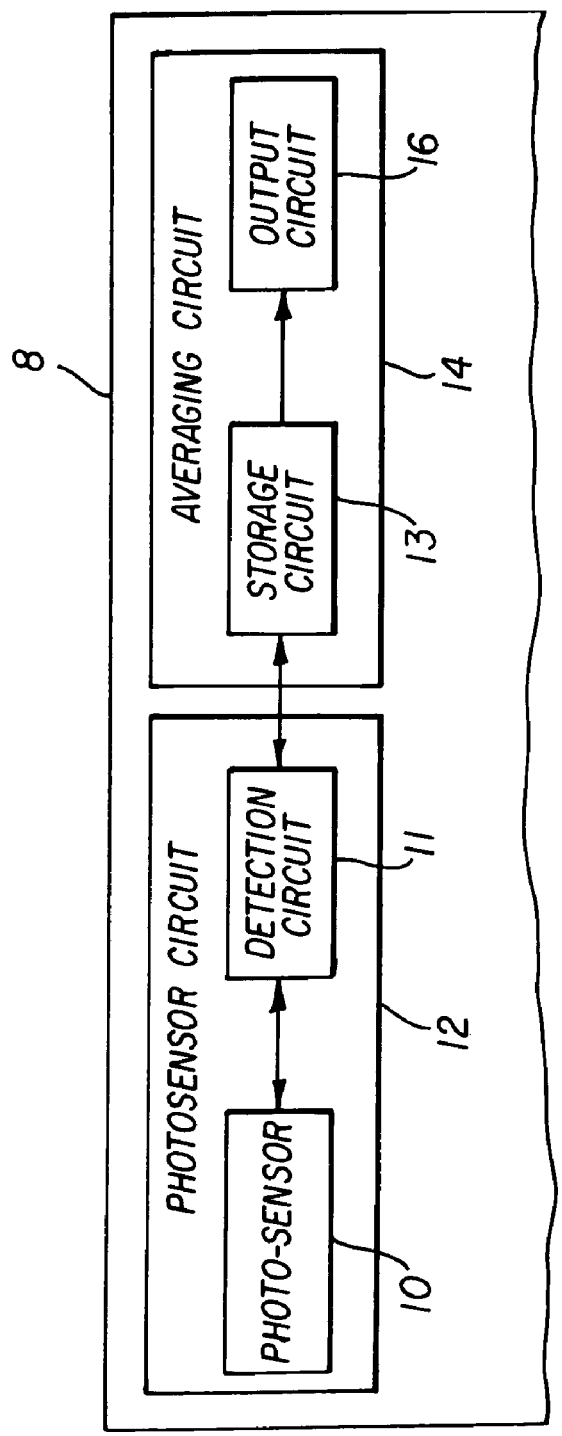
FIG. 1 is a schematic block diagram of a photosensor circuit according to the present invention.

Referring to FIG. 1, the present invention includes a circuit 8 having a photosensor 10 connected to a detection circuit 11. The detection circuit 11 and photosensor 10 form a photosensor circuit 12 that is connected to an averaging circuit 14 comprising a storage circuit 13 and an output circuit 16. The photosensor 10 may be any light-sensitive device suitable for use within a display system. For example, silicon or organic photodiodes or transistors may be employed. These photosensors and circuit elements may be discrete or, preferably, are integrated with a display to provide an integrated solution. When integrated with a display, any portion of, or all of, the circuit 8 may be constructed using thin film transistors and electrical components as are known in the flat panel display art. Display substrates may be made of rigid or flexible glass or plastic.

Figure 2:
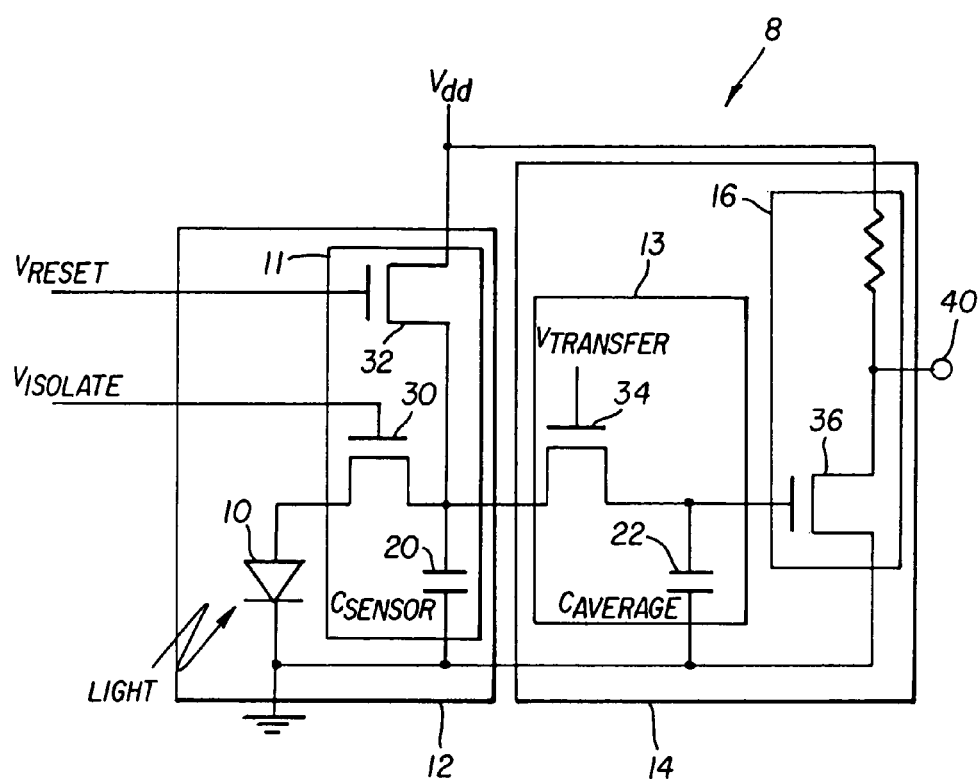
FIG. 2 is a schematic circuit diagram of one embodiment of the photosensor circuit of FIG. 1.

Referring to FIG. 2, a more detailed circuit diagram is shown. The photosensor 10 has two terminals, one of which is connected to a given voltage, for example ground, the other of which is connected to the drain of an isolation transistor 30. The gate of the isolation transistor 30 is connected to an isolation signal Visolate and the transistor source is connected to a capacitor 20 (Csensor) for storing a charge representative of the light incident on the photosensor 10. The capacitor 20 has one terminal connected to the given voltage terminal of the photosensor 10 and another terminal that is connected to the drain of a reset transistor 32. The reset transistor 32, capacitor 20, and isolation transistor 30 comprise the detection circuit 11. An external periodic reset signal drives the gate of the reset transistor 32 and the source of the reset transistor 32 is fixed to some known voltage (shown as Vdd) capable of charging the capacitor 20 when the reset signal turns on the reset transistor 32. The detection circuit 11 and the photosensor 10 form the photosensor circuit 12.

The periodic reset signal will periodically cause the capacitor 20 to charge to a known voltage, specified by Vdd and the reset transistor 32 characteristics. When the reset signal is charging the capacitor 20, the isolation transistor 30 is also turned on, thereby charging the photosensor 10 as well. While the capacitor 20 and photosensor 10 is charged, the output of the detection circuit is invalid, that is, it is not representative of the light incident on the phototransistor. After the reset signal is turned off, the photosensor 10 and the capacitor 20 are connected in parallel and, as light impinges on the photosensor 10, the capacitor 20 and the photosensor 10 discharge together through the isolation transistor 30 over time to produce a photo signal representative of the total flux of light incident on the photosensor 10 during an integration period between reset signals. After the integration period, the capacitor 20 and photosensor 10 will have a charge representative of the cumulative light incident on the photosensor during the integration period. The charge is inversely proportional to the ambient light incident on the photosensor 10, thus if more light is present, the charge will be smaller; if less light is present, the charge will be greater. The integrated light signal is measured because a periodic, integrated light signal collected over time is much more sensitive than a design that simply measures the instantaneous current from a photosensor.

The averaging circuit 14 includes a transfer transistor 34 whose gate is connected to a periodic transfer signal. A source of the transfer transistor 34 is connected to the sensor capacitor 20 and receives the photo signal. The drain of the transfer transistor 34 is connected to one terminal of an averaging capacitor 22. The other terminal of the averaging capacitor 22 is connected to the given voltage (e.g. ground). The transfer transistor 34 and the averaging capacitor 22 comprise a storage circuit 13 for an average photo signal.

At the end of the light integration time period, the isolation transistor 30 is turned off and the transfer transistor is turned on. The charge on the sensor capacitor 20 is then combined with the charge on the averaging capacitor 22 to form a charge representing an average signal. If the capacitors are equal in value, the charge will be the average of the charge on the two capacitors. If not, the average charge will be the ratio of the relative capacitor sizes and charges. When the capacitor charges are redistributed and the voltage across both capacitors is equal, the transfer transistor 34 is turned off and the reset and isolation transistors (32 and 30) are turned on and the cycle begins again.

The output circuit 16 includes an output transistor 36 whose gate is connected to the averaging capacitor 22. The source is connected to a resistive load that is connected to a power signal such as Vdd to form an output signal 40 representative of the ambient illumination incident on the photosensor 10. The drain can be connected to a given voltage. As configured, the output circuit provides an inverting amplifier whose input is the average signal representing a continuous running average of the successive photo signals and that produces an average ambient light signal output. When the charge stored in the capacitor 22 is large enough to cause the output transistor 36 to turn on, the output signal will be connected to the given voltage. When the charge stored in the capacitor 22 is smaller, the output transistor 36 will have an increasing impedance and the average ambient light signal 40 will increase up to the limit of the power signal, e.g. Vdd.

When the photosensor circuit is first powered up, the ambient light falling on the photosensor 10 is unknown, as is the charge in the capacitors and the value of the output signal. After an initial cycle, the charge in the sensor capacitor 20 will correctly represent the ambient illumination incident on the photosensor 10 and will be transferred to the averaging capacitor 22. At this point, the voltage across the averaging capacitor 22 will not necessarily be equivalent to the voltage across the sensor capacitor 20 at the end of the light integration cycle but will be closer than before the charge transfer from the sensor capacitor 20. The voltage across the averaging capacitor 22 will, in fact, represent the average charge in the sensor capacitor 20 and the averaging capacitor 22 weighted by the relative sizes of the capacitors 20 and 22 and the charge originally stored in them. At each subsequent cycle, the voltage across the averaging capacitor 22 will come closer to the voltage across the sensor capacitor 20 as charge is transferred to or from the averaging capacitor 22. Eventually, the voltage across both capacitors will be the same. After each cycle, the averaging capacitor 22 will store the average of the charge in the sensor capacitor 20 and the previous charge in the averaging capacitor 22 (weighted by capacitor size). Thus, the charge in the averaging capacitor 22 represents a continuous running average of the charges stored in successive cycles within the sensor capacitor 20.

If the ambient light on the photosensor 10 changes, the charge in the sensor capacitor 20 will change and the voltage across the averaging capacitor will also change to match. Note that the averaging capacitor 22 does not need an explicit reset or charge deposition into a known state. Instead, the charge on the averaging capacitor 22 gradually assumes the correct value as charge is transferred from the sensor capacitor 20. Hence, the output from the output circuit 16 is always valid and gradually assumes the correct value without creating abrupt discontinuous changes. Moreover, the output signal provides a continuous, analog signal that is representative of the ambient illumination over a wide range, limited by the saturation of the sensor capacitor 20 in bright conditions, and by the minimum output transistor 36 threshold voltage. By modifying the sizes of the capacitors 20 and 22, the sensitivity range of the circuit to ambient light may be modified and by changing the ratio of the capacitor sizes, the extent of averaging can be controlled.

Figure 3:
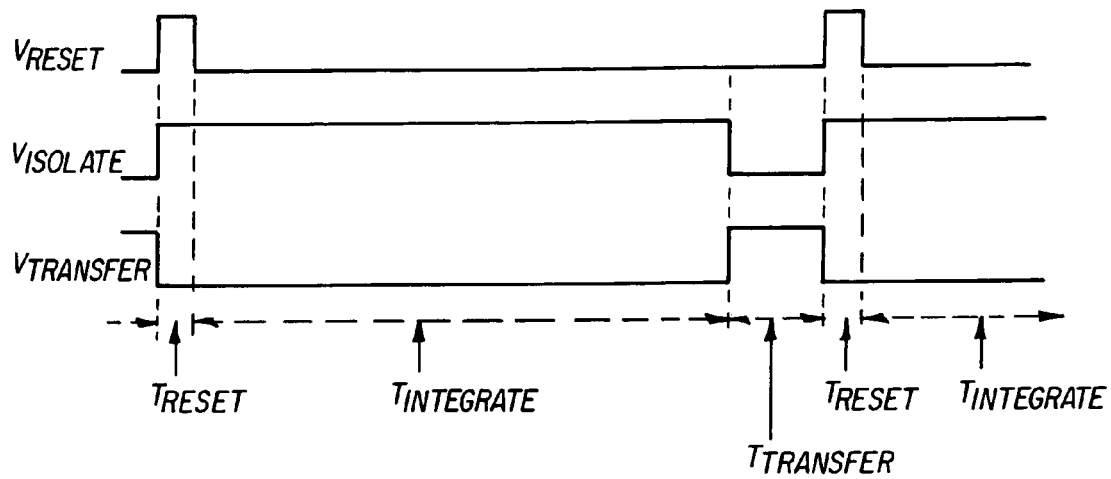
FIG. 3 is a timing diagram useful in describing the operation of the circuit of FIG. 2.

The timing signals for this circuit are illustrated in FIG. 3, where T represents the length of time the signals are applied in the states indicated.

The transfer and isolate signals driving the transfer transistor 34 and isolate transistor 30 respectively, are inverses of each other; that is, one signal is the inverse of the other. Therefore, the signals can be derived from a single signal, preferably the isolation signal. An inverse signal is readily created using a circuit like the output circuit 16 having a transistor whose gate is connected to the signal, drain is connected to a known voltage such as a ground, and whose source is connected through a load to a power signal.

It is also possible to simplify the circuit of FIG. 2 by eliminating the isolation transistor 30 and isolate signal. In this case, while the transfer transistor 34 is on, the sensor capacitor 20 and averaging capacitor 22 will continue to discharge, depending on the ambient light incident on the photosensor 10. Thus, the voltage will vary more and the output will not be as stable.

Alternative photosensor circuits may be employed and are included in the present invention. For example, photo capacitors that charge in the presence of light may be employed to provide a photo signal. In this embodiment, a reset signal must be employed to periodically discharge the photo capacitor. Photo resistors, photodiodes, and phototransistors may also be employed to discharge a sensor capacitor.

Figure 4:
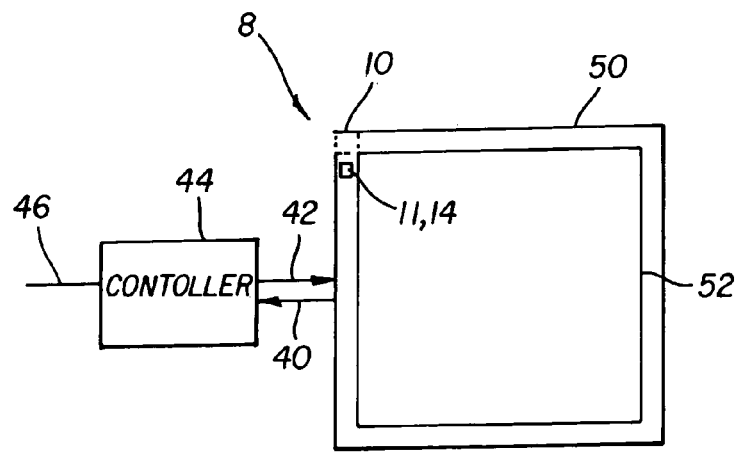
FIG. 4 is a schematic diagram of an embodiment of a photosensor circuit and display device according to the present invention.

The photosensor circuit of FIGS. 1 and 2 may be employed in a display system as shown in FIG. 4. Referring to FIG. 4, a substrate 50 has an array of light emitting elements, for example OLEDs, in a display area 52 and a photosensor circuit 8 integrated on the substrate 50. The photosensor circuit 8 provides an output signal 40 to a controller 44. The controller 44 responds to the output signal 40 and an input signal 46 to produce a display signal 42 that drives the display.

The signal from a thin film photosensor 10 is directly related to the area that it covers and the ambient radiation incident upon it. By increasing the area of an integrated photosensor 10, the output signal 40 from the circuit 8 may be increased without significantly increasing the size of the display.

A plurality of photosensors 10 can be electrically connected in common to provide one integrated photo signal or, alternatively, they can be separately addressed or combine their output. A greater number or size of integrated photosensors 10 can increase the signal, thereby improving the responsiveness of the ambient light detection. Moreover, the signal will be more representative of the overall ambient illumination incident on the display since, if a portion of the display is shadowed, having several sensors can provide several signals that can be averaged to produce an overall average of the illumination incident on the display area. Indeed, the location and shape of any shadows falling upon the display area 52 may be determined to a limited extent, thereby providing further information that can be used to optimize the performance of the display.

The photosensor(s) 10 of the present invention are sensitive to the frequency distribution of the light incident upon the photosensor. This sensitivity is due to the absorption spectrum of the materials and to the structure of the layers used to construct the photosensor. The frequency sensitivity of the device may be modified by providing color filters between the photosensor and the ambient radiation. Such filters can be used to customize the ambient light response of the photosensor(s) 10.

The present invention may be used in both top and bottom emitting OLED display structures. Thin film structures used for active matrix OLED displays may be employed to form the photosensors 10 and to provide circuitry 11 and 14 to generate and process suitable control signals for the photosensors 10. The same power and control signal methods may be used to operate the display. There are also a variety of ways in which the photosensors can be connected that depend on various factors such as the layout of the display and the conductivity of the electrodes and signal lines.

The photosensor elements may be selected individually (as are the display pixel elements) or in groups. Existing address and signal lines may be used to select or reset elements using existing electronic control methods. Groups of photosensor elements can be joined either physically or logically to provide a measure of incident light over larger areas thus reducing both the specificity of the information and the need for supporting logic and interconnects.

It is also possible to use the present invention to obtain information concerning the color of the ambient illumination. By utilizing color filters located between the photosensor and the ambient light, the ambient light may be filtered. Color filter deposition techniques are well known in the art and have been publicly demonstrated for displays. If a plurality of photosensors are provided with different filters, the signals from the photosensors can be used to optimize the display, for example by adjusting the color or white point of the display. In this case only, photosensors with color filters of the same color would be connected in parallel.

The light emitting display may be an organic light emitting diode (OLED) display that includes multiple supporting layers such as light emitting layers, hole injection, hole transport, electron injection, and electron transport layers as is known in the art. The photosensor circuit 8 may be deposited in a common step with active matrix display circuitry and may include identical materials to simplify processing and manufacturing.

Any or all of the photosensor circuit 10, the detector circuit 11, and the averaging circuit 14 can be integrated directly onto the same substrate as the display device or it can be implemented externally to the display. In general, higher performance and greater accuracy can be achieved by integrating the circuitry directly with the display device but this may not be desirable for all display devices.

In a preferred embodiment, the invention is employed in a device that includes Organic Light Emitting Diodes (OLEDs) which are composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The invention has been described in detail with particular reference to certain preferred embodiments thereof, but it will be understood that variations and modifications can be effected within the spirit and scope of the invention.

PARTS LIST 8 circuit
10 photosensor
11 detection circuit
12 photosensor circuit
13 storage circuit
14 averaging circuit
16 output circuit
20 capacitor
22 averaging capacitor
30 isolation transistor
32 reset transistor
34 transfer transistor
36 output transistor
40 output signal
42 display signal
44 controller
46 input signal
50 substrate
52 display area

What is claimed is:

1. A circuit for detecting ambient light on a display comprising:

a) a light integrating photo-sensor circuit having a photosensor and being responsive to ambient light for periodically producing successive photo signals representing the intensity of the ambient light; and b) an averaging circuit for receiving the successive photo signals and producing an average ambient light signal representing a continuous running average of the successive photo signals;

wherein the photosensor circuit includes a sensor capacitor, a reset transistor for applying an initial charge to the sensor capacitor, and a photosensor for discharging the sensor capacitor.

2. The circuit claimed in claim 1, wherein the photosensor is a photodiode.

3. The circuit claimed in claim 1, wherein the photosensor is a photo capacitor.

4. The circuit claimed in claim 1, wherein the photosensor is a phototransistor.

5. The circuit claimed in claim 1, wherein the photosensor circuit and the averaging circuit are thin-film devices.

6. The circuit claimed in claim 1, wherein the photosensor is an organic photosensor.

7. The circuit claimed in claim 1, wherein the photosensor is a silicon photosensor.

8. The circuit claimed in claim 1, further comprising an isolation transistor for connecting the photosensor to the sensor capacitor.

9. A circuit for detecting ambient light on a display comprising:
   a) a light integrating photo-sensor circuit having a photosensor and being responsive to ambient light for periodically producing successive photo signals representing the intensity of the ambient light; and
   b) an averaging circuit for receiving the successive photo signals and producing an average ambient light signal representing a continuous running average of the successive photo signals;
   wherein the averaging circuit includes an averaging capacitor for storing the average signal and a transfer transistor for periodically combining a photo signal with the average signal.

10. The circuit claimed in claim 9, further comprising a transistor output amplifier.

11. The circuit claimed in claim 1, wherein the photosensor circuit and averaging circuit are integrated on a common substrate.

12. A display, comprising:
   a) a substrate;
   b) a display area comprising an array of addressable light emitting elements formed on the substrate;
   c) a circuit according to claim 1 for detecting ambient light on a display including
      i) a light integrating photosensor circuit having a photosensor and being responsive to ambient light for periodically producing successive photo signals representing the intensity of the ambient light, and
      ii) an averaging circuit for receiving the successive photo signals and producing an average ambient light signal representing a continuous running average of the successive photo signals;
   wherein the photosensor circuit includes a sensor capacitor, a reset transistor for applying an initial charge to the sensor capacitor, and a photosensor for discharging the sensor capacitor; and
   d) a controller responsive to the average ambient light signal and display control signals to control the display.

13. The display claimed in claim 12, wherein the display area is rectangular and the photosensor is located at an edge of the rectangular display area.

14. The display claimed in claim 12, wherein the display area is rectangular and the photosensor is located at a corner of the rectangular display area.

15. The display claimed in claim 12, further comprising a plurality of photosensor circuits.

16. The display claimed in claim 15, wherein the photosensor(s) of the photosensor circuits surround the display area.

17. The display claimed in claim 12, further comprising a color filter located over a light receiving surface of the photosensor.

18. The display claimed in claim 12, wherein the light emitting elements, the photosensor, and/or the photosensor circuit are integrated on a common substrate.

19. The display claimed in claim 12, wherein the light emitting elements are OLEDs.

20. The display claimed in claim 12, wherein the circuit for detecting ambient light is formed on the substrate.

21. The display claimed in claim 12, wherein the photosensor is formed on the substrate.

22. A display, comprising:
   a) a substrate;
   b) a display area comprising an array of addressable light emitting elements formed on the substrate;
   c) a circuit according to claim 10 for detecting ambient light on a display including
      i) a light integrating photosensor circuit having a photosensor and being responsive to ambient light for periodically producing successive photo signals representing the intensity of the ambient light, and
      ii) an averaging circuit for receiving the successive photo signals and producing an average ambient light signal representing a continuous running average of the successive photo signals;
   wherein the averaging circuit includes an averaging capacitor for storing the average signal and a transfer transistor for periodically combining a photo signal with the average signal; and
   d) a controller responsive to the average ambient light signal and display control signals to control the display.

* * * * *